(12) United States Patent
Hager et al.

(10) Patent No.: US 12,313,124 B2
(45) Date of Patent: May 27, 2025

(54) BEARING ELEMENT HAVING A SENSOR AND A TELEMETRY DEVICE

(71) Applicant: Miba Gleitlager Austria GmbH, Laakirchen (AT)

(72) Inventors: Gunther Hager, Micheldorf (AT); Stefan Schallmeiner, Steyrermuehl (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 192 days.

(21) Appl. No.: 18/023,467

(22) PCT Filed: Aug. 30, 2021

(86) PCT No.: PCT/AT2021/060302
§ 371 (c)(1),
(2) Date: Feb. 27, 2023

(87) PCT Pub. No.: WO2022/040716
PCT Pub. Date: Mar. 3, 2022

(65) Prior Publication Data
US 2023/0313839 A1 Oct. 5, 2023

(30) Foreign Application Priority Data

Aug. 31, 2020 (AT) .............................. A 50738/2020

(51) Int. Cl.
*F16C 41/00* (2006.01)
*F16C 17/02* (2006.01)
(52) U.S. Cl.
CPC .............. *F16C 41/00* (2013.01); *F16C 17/02* (2013.01); *F16C 2233/00* (2013.01)

(58) Field of Classification Search
CPC .... F16C 7/02; F16C 7/023; F16C 9/02; F16C 9/04; F16C 17/02; F16C 17/24; F16C 17/243; F16C 17/246; F16C 41/00; F16C 2233/00
See application file for complete search history.

(56) References Cited

U.S. PATENT DOCUMENTS

| 3,052,123 | A | * | 9/1962 | Gustafson | ............. | F16C 37/002 |
|   |   |   |   |   |   | 374/185 |
| 5,127,747 | A |   | 7/1992 | Hilby et al. |   |   |
| 9,638,258 | B2 |   | 5/2017 | Niarfeix |   |   |
| 11,268,576 | B2 |   | 3/2022 | Hager et al. |   |   |

(Continued)

FOREIGN PATENT DOCUMENTS

| AT | 408 900 B | 3/2002 |
| AT | 521 598 A4 | 3/2020 |

(Continued)

OTHER PUBLICATIONS

International Search Report in PCT/AT2021/060302, mailed Nov. 19, 2021.

*Primary Examiner* — Alan B Waits
(74) *Attorney, Agent, or Firm* — Collard & Roe, P.C.

(57) ABSTRACT

A bearing element includes a bearing element body and a sensor for measuring at least one operating parameter of the bearing element, as well as a telemetry device, wherein the bearing element body is connected to the telemetry device, and the telemetry device is connected to the sensor by electric conductors.

12 Claims, 2 Drawing Sheets

(56) References Cited

U.S. PATENT DOCUMENTS

Figure 1:
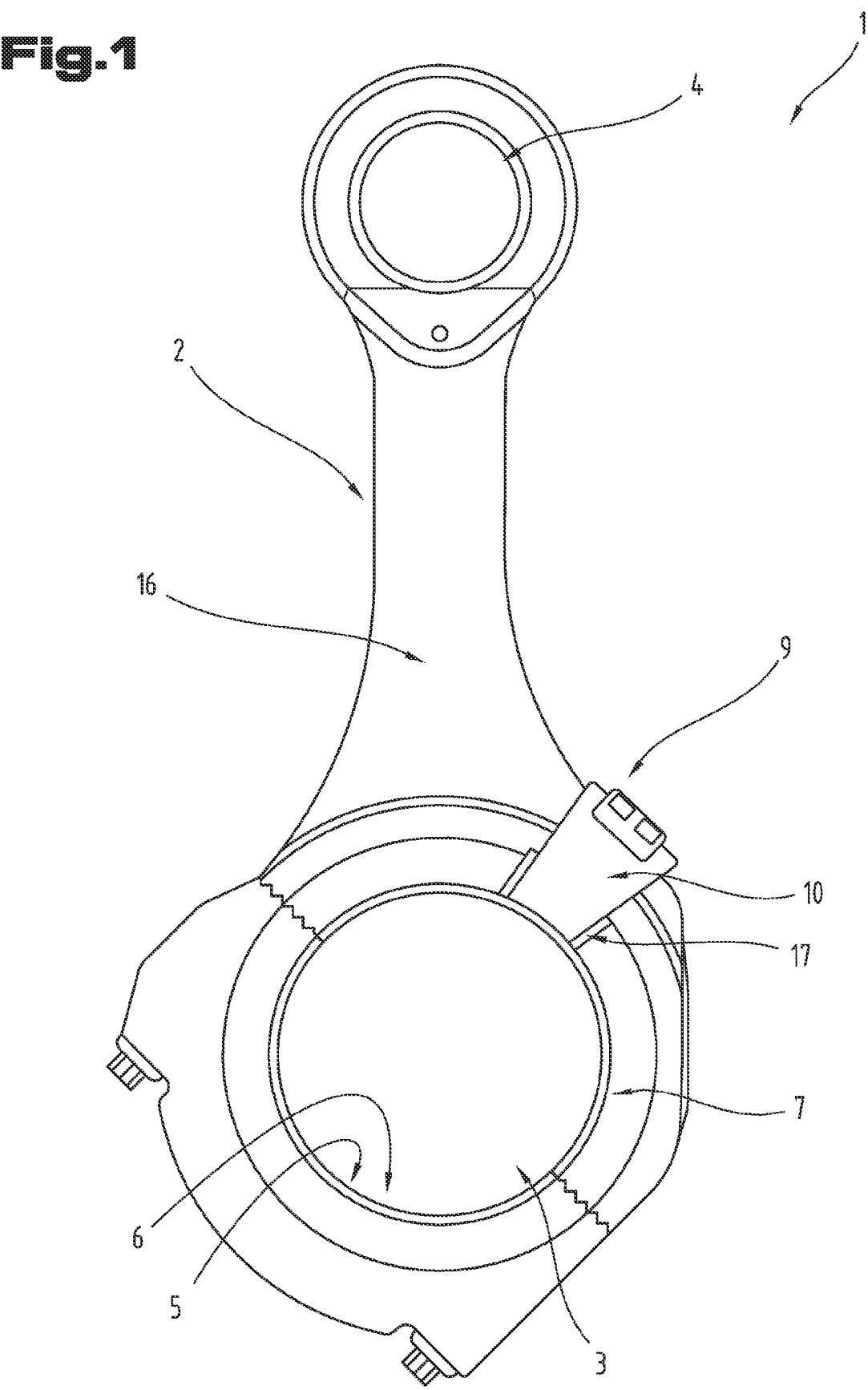

| | | | |
|---|---|---|---|
| 11,486,441 B2 | 11/2022 | Hamdard | |
| 2002/0157470 A1 | 10/2002 | Noetzel et al. | |
| 2007/0030162 A1 | 2/2007 | Okada et al. | |
| 2016/0223496 A1 | 8/2016 | Klos et al. | |
| 2019/0195284 A1* | 6/2019 | Oda | F16C 33/08 |
| 2020/0290715 A1* | 9/2020 | Kuhlmann | G01B 7/144 |
| 2022/0403889 A1* | 12/2022 | Hager | F16C 7/02 |

FOREIGN PATENT DOCUMENTS

| | | | | |
|---|---|---|---|---|
| AT | 522 972 A4 | 4/2021 | | |
| DE | 199 19 006 A1 | 11/2000 | | |
| DE | 10 2013 225 330 A1 | 6/2015 | | |
| DE | 10 2015 221 276 A1 | 5/2016 | | |
| DE | 10 2017 210 783 A1 | 12/2018 | | |
| EP | 2527809 A1 * | 11/2012 | | G01L 1/18 |
| EP | 2 952 870 A1 | 12/2015 | | |
| JP | 60098214 A * | 6/1985 | | |
| WO | 2015/036021 A1 | 3/2015 | | |
| WO | 2015/086691 A1 | 6/2015 | | |
| WO | 2016/119949 A1 | 8/2016 | | |
| WO | 2020/041808 A1 | 3/2020 | | |
| WO | 2020/041809 A1 | 3/2020 | | |

* cited by examiner

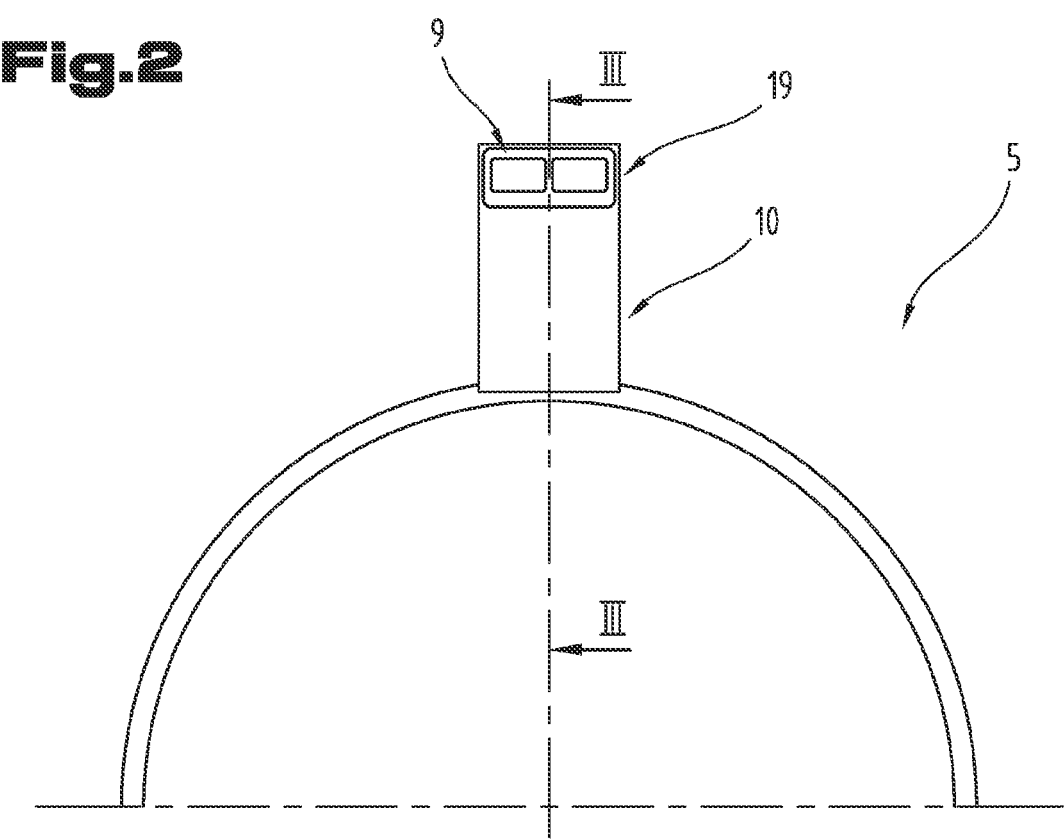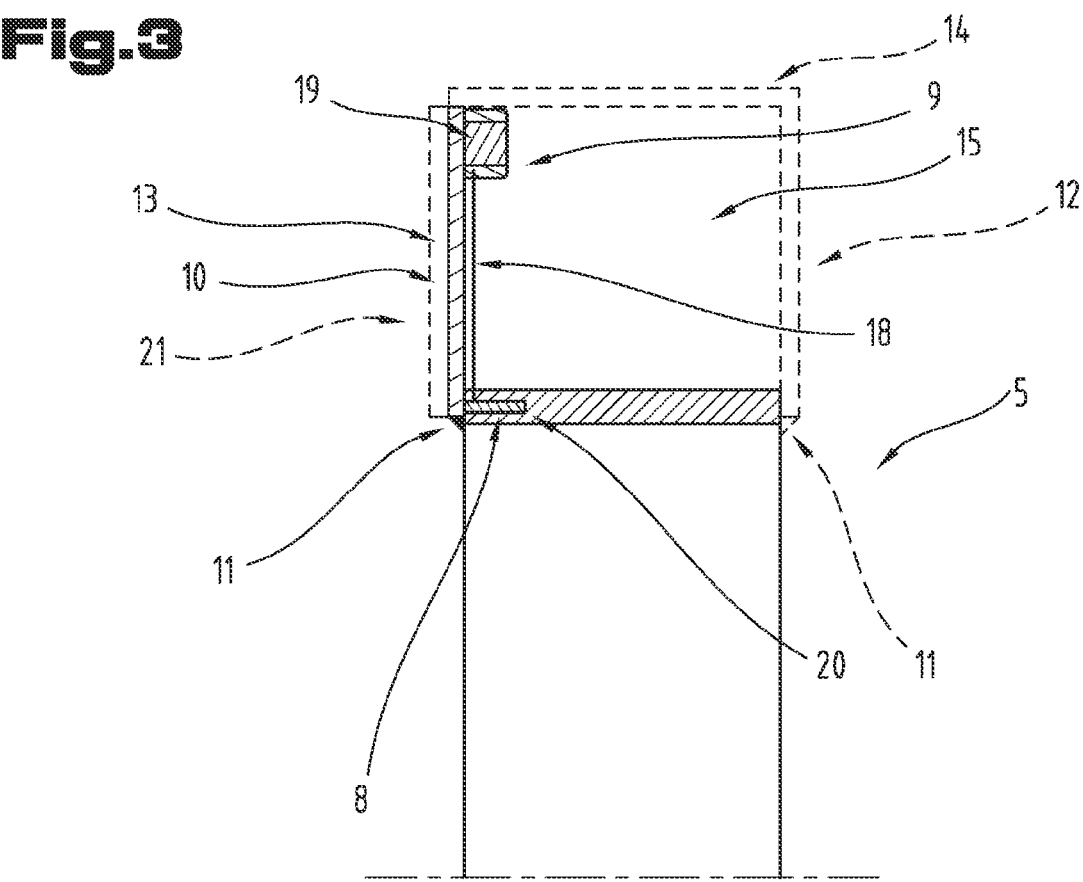

BEARING ELEMENT HAVING A SENSOR AND A TELEMETRY DEVICE

CROSS REFERENCE TO RELATED APPLICATIONS

This application is the National Stage of PCT/AT2021/060302 filed on Aug. 30, 2021, which claims priority under 35 U.S.C. § 119 of Austrian Application No. A50738/2020 filed on Aug. 31, 2020, the disclosure of which is incorporated by reference. The international application under PCT article 21(2) was not published in English.

The invention relates to a bearing element comprising a bearing element body, a sensor for measuring an operating parameter of the bearing element as well as a telemetry device.

Furthermore, the invention relates to a bearing assembly with a bearing receptacle and with at least one bearing element arranged in the bearing receptacle.

During the past years, the sensory observation of sliding bearings gained increasing significance. Besides indirect measurement of sliding bearing parameters, for example due to the temperature increase of the bearing receptacle, the arrangement of sensors inside or in the immediate vicinity of the lubrication gap is increasingly at the forefront of development. Not only the environmental conditions for the sensor technology are problematic, but also the mechanical characteristics of plain bearings, such as the presence of rotating components. AT 408 900 B is mentioned by way of example, from which a device for monitoring a sliding bearing is known, which comprises a bearing shell clamped in a support body, with at least one measuring sensor arranged in the bearing shell region for temperature-dependent measuring signals and with an evaluation circuit for the measuring signals.

In this context, it is known from AT 521 598 A4 that, for improving the compactness of such sliding bearing element assemblies, an indentation is formed on a radial sliding bearing element end face, in which indentation a telemetry device is arranged, or that the telemetry device is arranged on or at least partially in the bearing receptacle.

The underlying object of the present invention is to further improve such a bearing element provided with a sensor.

In the initially mentioned bearing element, the object of the invention is achieved in that the bearing element body is connected to a telemetry device, wherein the telemetry device is connected to the sensor.

Moreover, the object of the invention is achieved by means of the initially mentioned bearing assembly, which comprises the bearing element according to the invention.

The advantage of this is that by connecting the bearing element body to the telemetry device, an overall system can be provided, which features essential parts for monitoring bearings already in an integrated state, so that merely minimal adaptations and/or minor installation works are required on the user side. Additionally, this allows the system being tested by the manufacturer prior to delivery, and this tested system remains in this tested configuration even upon delivery.

According to an embodiment variant of the invention, it may be provided that the telemetry device is connected to the bearing element body by means of a connecting element. Thus, it is more easily possible to take into account different materials in the bearing element and in the telemetry device upon establishing the connection.

In this regard, it may be provided according to a further embodiment variant of the invention, that the connecting element has a strip-shaped or strap-shaped design. By means of this design, the telemetry device may be arranged further away from the rotating parts of a bearing, like, in particular, a shaft. This allows for a better protection of the components of the telemetry device and/or also an easier data transmission with less interference from the telemetry device to a receiver.

To better affix the telemetry device, it may be provided according to a further embodiment variant of the invention that the strap-shaped connecting element has a U-shaped design with two legs, wherein both legs are connected to the bearing element body. Thereby, a better fixation of the bearing element in a bearing receptacle is also achievable in that the bearing receptacle extends through the opening that is formed by the strap-shaped connecting element and the bearing element body, and in particular abuts the connecting element.

According to another embodiment variant of the invention, it may be provided that the sensor is connected to the telemetry device via electric conductors. The transmission of measured values from the sensor to the telemetry device may thus be formed in a more interference-proof manner—compared to a wireless transmission.

In this regard, a further embodiment variant of the invention is advantageous, which provides that the electric conductors are arranged on the connecting element, as thus, the degree of prefabrication of the bearing element for installation in a bearing can be further improved.

According to another embodiment variant of the invention, it may also be provided that additionally, an energy supply device is provided in the overall system, which energy supply device is connected, in an electrically conducting manner, to the sensor, whereby the self-sufficiency of the measuring system can be improved.

In this regard, it may be provided according to a related embodiment variant that the electrically conductive connection of the energy supply device to the sensor is established via further electric conductors, wherein the further electric conductors are arranged on the connecting element, whereby a further increase of the degree of prefabrication of the bearing element for installation in a bearing can be achieved.

To further increase the functionality of this bearing element according to the invention, it may be provided, according to a further embodiment variant, that the connecting element forms an axial sliding bearing, so that the bearing element may fulfil the axial bearing function in addition to the radial bearing function.

According to an embodiment variant in this regard it may be advantageous if the connecting element for forming the axial sliding bearing is coated with a sliding bearing material, as thus, the connection of the connecting element to the bearing element body can be made easier, on the one hand. Simultaneously, this also allows improving the axial bearing function. In other words, this does not necessitate a compromise with respect to the material selection for the connecting element, so that the connecting element also has an improved sliding property in addition to a better structural strength.

In the preferred embodiment variant of the invention, the bearing element body is designed as a sliding bearing element, as thus, the measured value detection can be performed more easily.

According to another embodiment variant of the invention, it may be provided that the bearing element body has a recess, and that the sensor is arranged in said recess, whereby the sensor can be better protected from the rotating parts of a bearing.

According to a further embodiment variant of the invention, it may be provided that the bearing receptacle is configured as a connecting rod, as it is easier to arrange the bearing element with the telemetry device thereon compared to other bearing receptacles.

According to another embodiment variant of the invention, it may be provided that the bearing receptacle has an indentation (a recess), in which the connecting element of the bearing element is at least partially accommodated. By means of this indentation, the installation position of the bearing element can be determined, so that an incorrect positioning during the installation of the bearing element can be avoided.

For the purpose of better understanding of the invention, it will be elucidated in more detail by means of the figures below.

These show in a simplified schematic representation:

FIG. 1 an embodiment variant of a bearing assembly in a frontal view;

FIG. 2 an embodiment variant of a bearing element in a frontal view;

FIG. 3 the bearing element according to FIG. 2 in a side view, shown in section according to section line II-II in FIG. 2.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a bearing assembly 1. The bearing assembly is preferably configured as a connecting rod 2 with a large connecting rod eye 3 and a small connecting rod eye 3. However, it should be noted that the bearing assembly 1 may also have a different configuration. For example, the bearing assembly 1 may be embodied as a bearing cap, as a bearing bracket, as a bearing block, as a gear, etc.

The bearing assembly 1 comprises at least one bearing element 5 having one bearing element body 6. In the preferred embodiment variant of the invention, the bearing element body 6 is embodied as a sliding bearing element. In principle, the bearing element 5 may, however, also be a rolling bearing element.

It should be pointed out that, if multiple bearing points are present, that is for example the large and the small connecting rod eye 3, 4 in the connecting rod 2 shown in FIG. 1, it is also possible that at least one bearing element 5 of each bearing point or multiple of the bearing elements 5 or all bearing elements 5 have the same design. However, generally, only one bearing element 5 may be designed according to the invention, that is, for example, the bearing element 5 arranged in the large connecting rod eye 3 in FIG. 1.

In the exemplary embodiment shown in FIG. 1, two sliding bearing elements are shown which have the shape of so-called half shells. However, it is also possible that the sliding bearing element is formed as a sliding bearing bush. Additionally, the sliding bearing equipped with the sliding bearing elements may have a different divide, so that, for example, three or four or more than four sliding bearing elements may be built into the sliding bearing. In very large sliding bearings, as they are used in wind energy plants, for example, the sliding bearing elements may, for example, also be designed as sliding bearing pads, wherein, in these cases, considerably more than four sliding bearing elements, for example up to 40 sliding bearing elements, may be present in the sliding bearing. One or multiple of these sliding bearing elements may be formed according to the invention.

The at least one sliding bearing element is arranged in a bearing receptacle 7, for example by means of a press fit. In the embodiment variant shown in FIG. 1, the bearing receptacle 7 is formed by the connecting rod 2, in particular by the large connecting rod eye 3.

FIGS. 2 and 3 show a bearing element 5 as it is used, for example, in the large connecting rod eye 3 of the connecting rod 2. The at least one bearing element 5 comprises at least one sensor 8 as this can be seen better in FIGS. 2 and 3. It is also possible for multiple sensors 8 to be arranged in the bearing element 5.

The sensor 8 serves to detect at least one physical quantity of the bearing element 5. For example, the sensor 8 may be a temperature sensor, a pressure sensor, a strain sensor, etc. With the aid of the at least one sensor 8, a parameter of the bearing element 5 can be acquired during operation. Based on this parameter, for example conclusions about the state of the at least one bearing element 5 may be made, as, for example, an anomalous increase in temperature may point to the wear of the sliding surface of the bearing element 5 and/or the failure of the bearing element 5. Thus, a parameter essential for the operation of the bearing element 5 can be acquired using the sensor.

The bearing element 5 further has a telemetry device 9, with which the measured values of the sensor 8 and/or the acquired data can be transmitted to a receiver spatially separated from the bearing element 5. For this purpose, the telemetry device 9 is connected to the at least one sensor 8. The telemetry device 9 can either only collect and forward or also evaluate the measured values and forward the data gained from the evaluation.

For processing the acquired parameters, that is the associated data, the telemetry device 9 may have a data processing element, which is arranged at a distance from the bearing element body 6. The data processing element may, however, also be part of an external evaluation device not belonging to the bearing element 5. For transmitting the data to this at least external data processing element, the telemetry device 9 may have a data transmission device, which receives the data from the at least one sensor 8 and transmits it, in particular wirelessly, to the at least one data processing element as the data receiver. For the wireless transmission of data, the known protocols can be used. The wireless transmission of data may take place, for example by means of Bluetooth or WLAN, LoWPAN, Zigbee ANT/ANT, etc.

As such systems for acquiring data in bearing elements 5 and wirelessly transmitting it to an external station is already known per se from the prior art relevant for sliding bearings, reference is made to said prior art in order to avoid repetitions regarding further details.

It is provided that the telemetry device 9 is connected to the bearing element body 6. The connection is fixed, that is a fixed connection. For this purpose, the connection may be established in a materially bonded and/or frictional manner. If applicable, the connection may also be established in a positive locking manner. Preferably, the connection is formed to not be releasable, that means that the connection cannot be released without destruction. However, a releasable connection is also possible, for example by means of screws.

For the purpose of connection, the telemetry device 9 may be connected directly to the bearing element body 6, for example in a materially bonded manner, for example be adhered or welded to it.

However, according to a preferred embodiment variant of the invention, the telemetry device 9 is not connected directly to the bearing element body 6, but rather via a connecting element 10. This connecting element 10 is connected to the bearing element body 6 on one side and to the telemetry device 9 on the other side. The connection may be established, in each case, in a materially bonded manner, for example by welding or soldering or adhering the connecting device 10 on the bearing element body 6. For this purpose, a weld seam 11, for example a fillet weld, may be formed between the connecting element 10 and the bearing element body 6. Likewise, the telemetry device 9 may be connected in a materially bonded manner, for example by welding, soldering or glued, to the connecting element 10.

By using the connecting element 10, an arrangement of the telemetry device 9 spaced apart from the bearing element body 6 can be achieved.

The connecting element 10 may be, for example, tubular or a profile with a U-shaped or C-shaped cross-section. Generally, any shape suitable for such a connecting element 10 may be used. According to an embodiment variant of the bearing element 5, however, it may be provided that the connecting element has a strip-shaped or strap-shaped design. Accordingly, FIG. 3 shows, in solid lines, a strip-shaped connecting element 10, which is formed from a flat profile.

The connecting element 10 preferably consists of a metal material. However, it may also be made from plastic and/or composite materials may also be used.

According to a further embodiment variant in this regard, it may be provided that the strap-shaped connecting element 10 is designed in a U-shape having two legs 12, 13 and a base 14 arranged therebetween, wherein both legs 12, 13 are connected to the bearing element body 6, in particular in their end region, as it is shown in dashed lines in FIG. 3. With this embodiment variant of the connecting element 10, a recess 15, which is bounded by the legs 12, 13 and the base 14, can be provided, in which recess 15 a part of the bearing receptacle 7, that is for example the connecting rod 2, can be received, for example a region at the transition from the large connecting rod eye 3 to a connecting shaft 16 of the connecting rod 2, as can be seen in FIG. 1.

The legs 12, 13 and the base 14 and/or the connecting element 10 may have a rectangular design, for example. The legs 12, 13 may also have a different shape, for example a trapezoidal shape as it is evident in FIG. 1, in which shape the connecting element 10 and/or the legs 12, 13 taper in the direction towards the large connecting rod eye 3. However, other shapes are also possible. For example, the base 14 may be formed having an undercut in order to additionally make a positive locking connection possible.

According to an embodiment variant of the bearing assembly 1, it may be provided that the bearing receptacle 7 has an indentation 17, in which the connecting element 10 of the bearing element 4 is at least partially accommodated. The indentation 17 may have a groove-shaped design, for example, as it can be seen in FIG. 1. In this regard, the groove-shaped indentation 17 may extend at least approximately in the radial direction.

The indentation 17 may have a width, in the circumferential direction of the bearing element 5, that is greater than the width of the connecting element 10 accommodated therein, or which is great enough that a positive connection is established between the indentation 17 and the connecting element 10. By means of the indentation 17, the correct position of the bearing element 5 relative to the bearing receptacle 7 can be defined and/or determined.

The connection between the at least one sensor 8 and the telemetry device 9 may be formed in a line-connected manner with electric conductors 18. In principle, wires may be used for this purpose. These may be arranged on, in particular connected to, the connecting element 10. However, it is also possible that the electric conductors 18 are provided by means of conducting paths formed on the connecting element 10. The conducting paths may be covered by a protective layer, for example a protective lacquer.

According to a further embodiment variant of the invention, it may be provided that the bearing assembly 1 and/or the bearing element 5 has an energy generating device 19 (FIG. 2). With the aid of said energy generating device 19, it is possible to supply the at least one sensor 8 and/or the data transmission device and/or the data processing device of the telemetry device 9 autarkically with electrical energy, so that no wire-bound outward connections of the bearing assembly 1 are required for this purpose.

The at least one energy generating device 19 (there could also be more than one energy generating device 19 arranged in the bearing assembly 1) may be arranged in and/or on the at least one bearing element 5 or the bearing receptacle 7 or in the telemetry device 9, for example in a recess.

The energy generating device 19 may have at least one piezo element. Depending on the required energy quantity, it is also possible for more than one piezo element to be arranged, for example in the form of a piezo element package.

Merely for the sake of completeness, it should be noted that the functional principle of a piezo element is not described as it is extensively described in the literature and also known to the person skilled in the art.

The at least one piezo element may be pretensioned under a pressure.

The at least one piezo element may consist of lead zirconium titanate (PZT), for example. However, other piezoelectric materials can also be used.

As an alternative for the preceding embodiments with the piezo element pretensioned under pressure, or in addition thereto, it may be provided that the energy generating device 19 is the sensor 8 itself. For this purpose, the sensor 8, which, in this case, is in particular a pressure sensor, preferably an indicating sensor and/or cylinder pressure indicating sensor, may be hydrostatically connected, via a line, to a lubrication gap of a bearing assembly 1 formed as a sliding bearing assembly. Via this line, the sensor 5 can be impinged upon by the lubrication gap pressure, so that thereby, the pressure of the lubricant in the lubrication gap can be measured.

In this case, the sensor 8 may be a piezo-active and/or piezo-electric element, by means of which electrical energy can also be generated, possibly not only by temporally and/or directionally changing accelerations relative to the sensor 8, but possibly also due to alternating pressure impact.

As an alternative or in addition thereto, it may be provided that the sensor 8 is arranged in the lubrication gap 14 of the sliding bearing assembly, for example as a part of the sliding layer of the sliding bearing element. With this, as well, the sensor 8 can be impinged upon by the lubrication pressure in the lubrication gap of the sliding bearing assembly, like in the previously mentioned embodiment variant of the sliding bearing assembly with the line to the lubrication gap.

The sensor 8 may be arranged in a recess in the bearing element body 6. It may also be provided that the sensor 8 is embedded into or arranged on a radially innermost layer of the bearing element 5 (for example of a sliding bearing element), for example in an indentation in this layer.

The energy generating device 19 may be connected, in an electrically conductive manner, to the telemetry device 9 via electric lines (e.g. cables). In this regard, it is also possible that the electric lines are arranged on the connecting element 10. Furthermore, these electric lines may also be configured as conducting paths.

For the sake of completeness, it should be noted in this context that in case of the bearing element 5 being formed as a sliding bearing element, it is a so-called multi-layer sliding bearing and has at least one sliding layer (on which the component to be mounted, for example a shaft, is supported and/or slides) and a support layer. Between these, further layers, such as a bearing metal layer and/or a bonding layer and/or a diffusion barrier layer, etc. may be arranged. The individual layers may be made of the materials known from the prior art for this purpose.

It may also be provided that the sensor 8 is arranged in a layer arranged underneath the sliding layer and is separated from the sliding layer via an electrically insulating layer.

With the bearing assembly 1, it is possible to monitor a bearing element 5 in a bearing receptacle 7 of the bearing assembly 1 with at least one sensor 8, wherein a measured value is acquired by means of the sensor 8, which measured value is forwarded to the data transmission device of the telemetry device 9 for the, particularly wireless, data transmission to a receiver of the data, and wherein the electrical energy for the sensor 9 and/or the data transmission device is generated by the movement of the bearing element 5 or the bearing assembly 1 during operation.

With the invention, a bearing element 5, in particular a sliding bearing element, can be provided, which forms an independent measuring unit for measuring physical quantities like pressure, temperature, strain on/in the bearing element 5. The overall system (the at least one sensor 8, the electric lines (conductor 18), the telemetry device 9, possibly the energy generating device 19) is fixedly connected to the bearing element body 6 and/or this overall system forms a functional unit with the bearing element body and possibly further parts (such as pins, connection rods).

Merely for the sake of completeness, it should be noted that the individual components of the telemetry device 9, such as the data transmission device, an energy generating device, a microprocessor, an analog-dialog-converter, etc. may be arranged individually on the connecting element 10. They may possibly be consolidated as assemblies. For a better protection, at least individual components of the telemetry device 9 may be arranged in a housing, wherein it may be provided in this case that the connecting element 10 forms a part of the housing. The housing may have a shape corresponding to the purpose.

According to a further embodiment variant of the bearing element 5, it may be provided that the connecting element 10 forms an axial sliding bearing. For this purpose, the connecting element 10 itself may be formed of a material known for sliding layers of a sliding bearing. However, according to a further embodiment variant, it is also possible that the connecting element 10 has a coating 21 of a sliding bearing material, e.g. an anti-friction varnish, for the formation of the axial sliding bearing. In this case, the sliding layer of the sliding bearing element may also possibly be formed integrally with the coating 21.

The exemplary embodiments show or describe possible embodiment variants of the bearing element 5 and/or the bearing assembly 1, while it should be noted at this point that combinations of the individual embodiment variants are also possible.

Finally, as a matter of form, it should be noted that for ease of understanding of the structure of the bearing element 5 and/or the bearing assembly 1, these are not obligatorily depicted to scale.

LIST OF REFERENCE NUMBERS

1 Bearing assembly
2 Connecting rod
3 Connecting rod eye
4 Connecting rod eye
5 Bearing element
6 Bearing element body
7 Bearing receptacle
8 Sensor
9 Telemetry device
10 Connecting element
11 Weld seam
12 Limb
13 Limb
14 Base
15 Recess
16 Connecting rod shaft
17 Indentation
18 Conductor
19 Energy generating device
20 Recess
21 Coating

The invention claimed is:

1. A bearing element for being arranged in a bearing receptacle of a bearing assembly comprising a bearing element body embodied as a sliding bearing element and a sensor for measuring at least one operating parameter of the bearing element, as well as a telemetry device, wherein the bearing element body is connected to the telemetry device by means of a connecting element, wherein the telemetry device is line-connected to the sensor by means of electric conductors wherein the connecting element has a strip-shaped or strap-shaped design and wherein the electric conductors are arranged on the connecting element.

2. The bearing element according to claim 1, wherein the strap-shaped connecting element is designed to be U-shaped having two legs, wherein both legs are connected to the bearing element body.

3. The bearing element according to claim 1, wherein the electric conductors are provided by means of conducting paths, which are formed on the connecting element.

4. The bearing element according to claim 3, wherein the conducting paths are covered with a protective layer.

5. The bearing element according to claim 1, wherein additionally, an energy supply device is provided, which is connected, in an electrically conductive manner, to the telemetry device and the sensor.

6. The bearing element according to claim 5, wherein the electrically conductive connection of the energy supply device and the sensor is formed via further electric conductors, wherein the further electric conductors are arranged on the connecting element.

7. The bearing element according to claim 1, wherein the connecting element forms an axial sliding bearing.

8. The bearing element according to claim 7, wherein the connecting element is coated with a sliding bearing material in order to form the axial sliding bearing.

9. The bearing element according to claim 1, wherein the bearing element body has a recess, and wherein the sensor is arranged in said recess.

10. A bearing assembly with a bearing receptacle and at least one bearing element, which is arranged in the bearing receptacle, wherein the bearing element is formed according to claim 1.

11. The bearing assembly according to claim 10, wherein the bearing receptacle is formed as a connecting rod.

12. The bearing assembly according to claim 10, wherein the bearing receptacle has an indentation, in which the connecting element of the bearing element is at least partially accommodated.

\* \* \* \* \*